(12) United States Patent
Mei et al.

(10) Patent No.: US 10,249,898 B2
(45) Date of Patent: Apr. 2, 2019

(54) MEMBRANE ELECTRODE ASSEMBLY AND ELECTROCHEMICAL CELL

(71) Applicant: KABUSHIKI KAISHA TOSHIBA, Tokyo (JP)

(72) Inventors: Wu Mei, Kanagawa (JP); Taishi Fukazawa, Tokyo (JP); Tianyi Yang, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 135 days.

(21) Appl. No.: 15/241,524

(22) Filed: Aug. 19, 2016

(65) Prior Publication Data

US 2017/0077539 A1    Mar. 16, 2017

(30) Foreign Application Priority Data

Aug. 20, 2015    (JP) .................................. 2015-162911

(51) Int. Cl.
*H01M 4/86*       (2006.01)
*H01M 8/1004*   (2016.01)
*H01M 4/92*       (2006.01)
*H01M 8/1018*   (2016.01)

(52) U.S. Cl.
CPC ....... *H01M 8/1004* (2013.01); *H01M 4/8626* (2013.01); *H01M 4/8657* (2013.01); *H01M 4/92* (2013.01); *H01M 2008/1095* (2013.01)

(58) Field of Classification Search
CPC .... H01M 8/1004; H01M 4/92; H01M 4/8657; H01M 4/8626; H01M 2008/1095
See application file for complete search history.

(56) References Cited

U.S. PATENT DOCUMENTS

| 7,147,957 | B1 * | 12/2006 | Hitomi | ............... H01M 4/8605 |
|---|---|---|---|---|
| | | | | 429/481 |
| 8,197,632 | B2 | 6/2012 | Suzuki | |
| 2002/0055034 | A1 | 5/2002 | Fukuda et al. | |
| 2005/0142433 | A1 | 6/2005 | Ueda et al. | |
| 2007/0026291 | A1 | 2/2007 | Kim et al. | |
| 2010/0021787 | A1 | 1/2010 | Wu et al. | |
| 2010/0239950 | A1 | 9/2010 | Mei et al. | |

(Continued)

FOREIGN PATENT DOCUMENTS

JP    4-169069    6/1992
JP    7-58617    6/1995

(Continued)

OTHER PUBLICATIONS

Mei et al.; "Development of Alternated Catalyst Layer Structure for PEM Fuel Cells", ECS Transactions, vol. 50, No. 2, pp. 1377-1384, (2012).

*Primary Examiner* — Stewart A Fraser
(74) *Attorney, Agent, or Firm* — Finnegan, Henderson, Farabow, Garrett & Dunner, L.L.P.

(57) ABSTRACT

In one embodiment, a membrane electrode assembly comprises a catalyst layer being porous and containing a catalyst material, the catalyst layer comprising a plurality of catalyst units each having a porous body structure or a laminated structure containing a void layer, and an electrolyte membrane adjacent to the porous catalyst layer. The catalyst unit bites into the electrolyte membrane, and an average biting ratio is not less than 10%, and not more than 80% of a thickness of the catalyst layer.

8 Claims, 7 Drawing Sheets

(56) References Cited

U.S. PATENT DOCUMENTS

| | | |
|---|---|---|
| 2013/0078550 A1 | 3/2013 | Mei et al. |
| 2013/0252132 A1* | 9/2013 | Mei .................... H01M 4/8657 429/482 |
| 2014/0065519 A1 | 3/2014 | Vincent et al. |

FOREIGN PATENT DOCUMENTS

| | | |
|---|---|---|
| JP | 2002-75382 | 3/2002 |
| JP | 2005-190780 | 7/2005 |
| JP | 2007-257888 | 10/2007 |
| JP | 2008-4486 | 1/2008 |
| JP | 2008-21609 | 1/2008 |
| JP | 2008-108594 | 5/2008 |
| JP | 2010-33759 | 2/2010 |
| JP | 2010-221090 | 10/2010 |
| JP | 2013-82999 | 5/2013 |
| JP | 2013-226537 | 11/2013 |
| JP | 5342824 | 11/2013 |
| JP | 2014-60152 | 4/2014 |

* cited by examiner

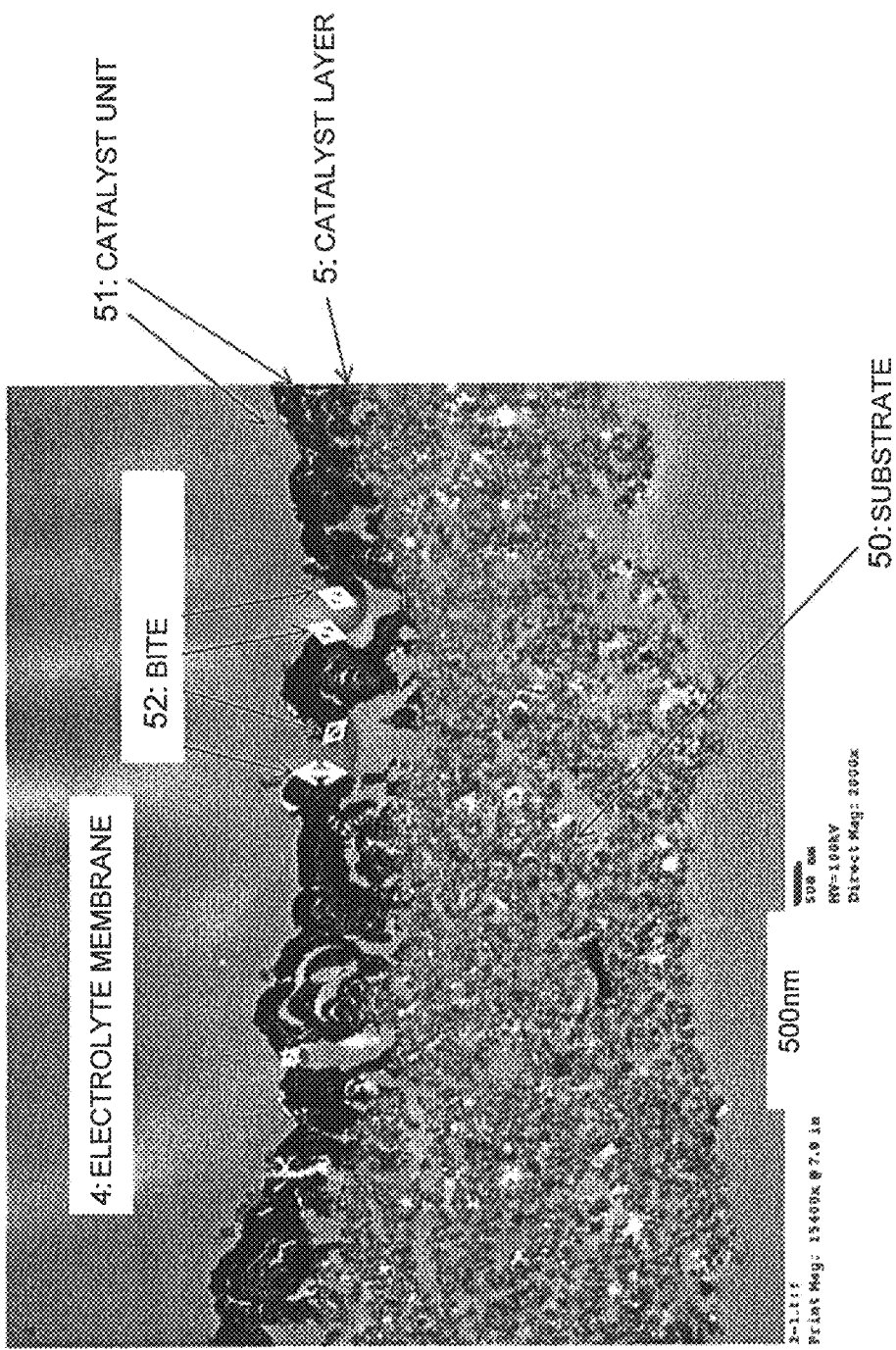

MEMBRANE ELECTRODE ASSEMBLY AND ELECTROCHEMICAL CELL

CROSS-REFERENCE TO RELATED APPLICATION

This application is based upon and claims the benefit of priority from the prior Japanese Patent Application No. 2015-162911, filed on Aug. 20, 2015, the entire contents of which are incorporated herein by reference.

FIELD

Embodiments of the present invention relate to a membrane electrode assembly, and an electrochemical cell using this.

BACKGROUND

Recently, electrochemical cells have actively been researched. A fuel cell, for example, out of the electrochemical cells, includes a system to generate power, by electrochemically reacting a fuel such as hydrogen and an oxidizing agent such as oxygen.

Among them, a polymer electrolyte membrane fuel cell (PEFC: Polymer Electrolyte Membrane Fuel Cell) has been put into practical use, as a stationary power source for domestic use and a power source for automobile, since a load to the environment is small.

As a catalyst layer contained in each electrode of the PEFC, a carbon carried catalyst in which a catalyst material is carried by a carbon black carrier is generally used.

The carbon carrier is eroded with the power generation of the fuel cell, the deterioration of the catalyst layer and a membrane electrode assembly (MEA: Membrane Electrode Assembly) containing the catalyst layer is large, and thereby a large amount of catalyst is used so as to ensure durability of the fuel cell. One of the large problems for spreading a PEFC is cost reduction by reducing a used amount of noble metal catalyst.

In order to avoid the catalyst deterioration by a carbon carrier, and to enhance catalytic activity and property of an electrochemical cell, a carrier-less porous catalyst layer has been proposed, and excellent durability and high property thereof have been ensured even with a small amount of platinum.

But the property of these catalyst layers is sensitive to variation of the operation environment. When the catalyst layer like this is applied to a cathode side of a fuel cell, the property is greatly deteriorated sometimes due to the humidity of air supplied to the fuel cell. As its measure, an improvement of a catalyst layer structure may be considered, but the robustness thereof is not sufficient yet, and a further improvement is required.

BRIEF DESCRIPTION OF THE DRAWINGS

FIG. 3 is a transmission electron microscope photograph of a low magnification of a section of the membrane electrode assembly according to the embodiment.

DETAILED DESCRIPTION

Hereinafter, embodiments of the present invention will be described in detail, with reference to the drawings. In addition, in the following description, the same symbols are given to the same members and so on, and the description of the members and so on which have been described once will be appropriately omitted.

Figure 1:
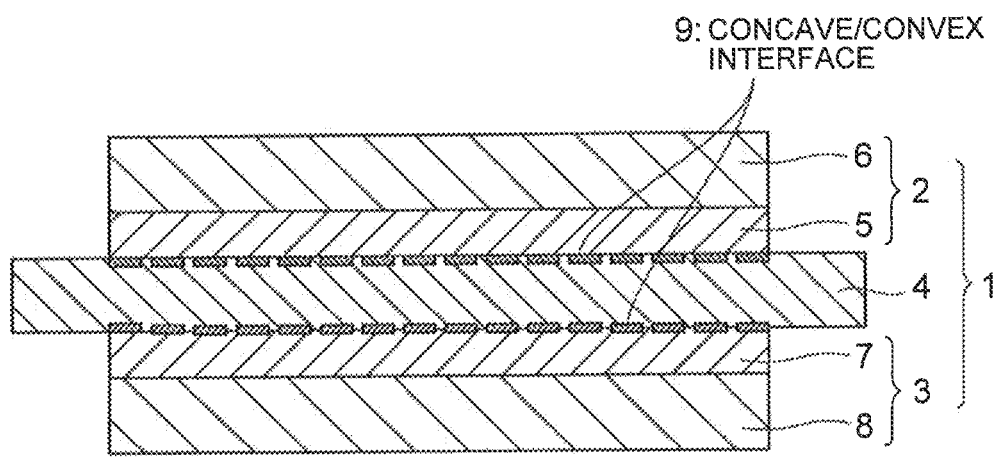
FIG. 1 is a sectional view of a membrane electrode assembly according to an embodiment.

FIG. 1 is a sectional view of a membrane electrode assembly (MEA) according to an embodiment of the present invention. A problem to be solved by the present invention is to provide a membrane electrode assembly in which robustness of the membrane electrode assembly is improved, a high cell voltage is obtained with a small amount of noble metal, and thereby power generation property is improved. An MEA 1 is composed of a first electrode 2 and a second electrode 3, and an electrolyte membrane 4 arranged between them. The first electrode 2 contains a first catalyst layer 5 contacting with the electrolyte membrane 4, and a first gas diffusion layer 6 laminated on this, and the second electrode 3 contains a second catalyst layer 7 contacting with the electrolyte membrane 4, and a second gas diffusion layer 8 laminated on this.

At least one of the catalyst layer 5 or the catalyst layer 7 contained in the MA 1, and an interface between it and the electrolyte membrane 4 respectively form a catalyst layer, and a catalyst layer-electrolyte membrane interface of the present embodiment which will be described in detail later. Particularly, it is preferable that the both of the first catalyst layer 5 and the second catalyst layer 7 form the respective catalyst layers, and the respective catalyst layer-electrolyte membrane interfaces of the present embodiment.

Hereinafter, the catalyst layer, and the interface between the catalyst layer and the electrolyte membrane of the present embodiment will be described in detail.

Figure 2A:
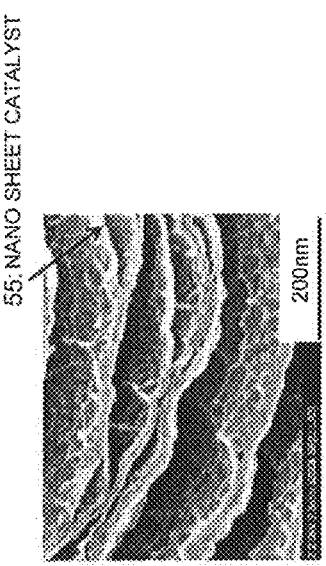
FIG. 2A, FIG. 2B, FIG. 2C, and FIG. 2D are views showing a unit of the carrier-less catalyst layer according to the embodiment.
Figure 2B:
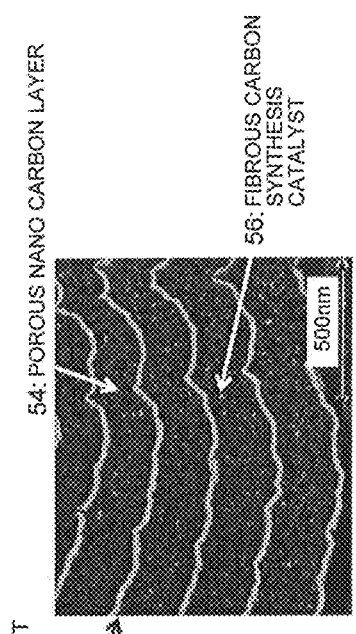
Figure 2C:
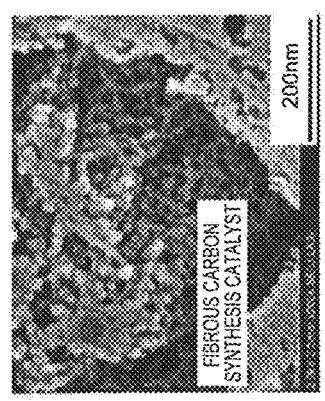
Figure 2D:
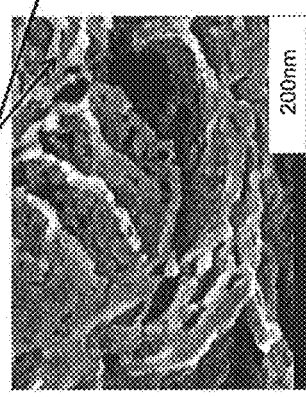

The catalyst layer according to the present embodiment is a carrier-less porous catalyst layer. A catalyst layer to be used in an electrochemical cell is generally composed of a carried catalyst in which a catalyst is carried on a surface of a material such as carbon that is used as a carrier, so as to obtain high cell property. It is reported that though a carrier material hardly contributes to a major electrode catalyst reaction, the carrier material can perform control of a catalyst material such as an improvement of a reaction area of the catalyst material, and in addition, can improve a hole structure, electric conductivity, ion conductivity, and so on by an electrochemical cell. To be carrier-less is not to use a carrier for a catalyst to compose a catalyst layer. This catalyst layer is characterised by being composed of a catalyst unit having a porous body structure or a laminated structure containing a void layer. When noble metal catalyst is used, it is possible that an electrochemical cell keeps high property and high durability, even with a small used amount. A catalyst unit having a porous body structure and a catalyst unit having a laminated structure containing a void layer are respectively shown in FIG. 2A and FIG. 2B. FIG. 2A shows a catalyst unit of a porous body structure, and FIG. 2B shows a catalyst unit having a laminated structure containing a void layer. When a catalyst material is carried by a carrier, the catalyst is generally in a particle state of a nano size, but in the case of a catalyst unit having a porous body structure, the catalyst itself is in a spongy shape. In the case of a catalyst unit having a laminated structure containing a void layer, the catalyst becomes in a nano sheet shape (a nano sheet catalyst 55). It is possible to improve the property of an electrochemical cell by using a catalyst of a spongy shape or a nano sheet shape. Since an electrode catalyst reaction is caused on a surface of a catalyst, a shape of the catalyst affects the atom arrangement, the electronic state of a surface of the catalyst. In the case of a catalyst unit having a laminated structure containing a void layer, it is preferable that the adjacent nano sheets themselves are partially integrated. Though the mechanism has not been completely clarified, this is because it is thought that proton conduction or hydrogen atom conduction contain for the electrode reaction can be attained more smoothly. In addition, as shown in FIG. 2C, a nano sheet inside the laminated structure is made porous, and thereby higher property can be obtained. This is because gas diffusion and water management can be improved. When a porous nano carbon layer 54 (FIG. 2D) ing fibrous carbon, or a nano ceramic material layer is arranged between the nano sheets inside the laminated structure, the durability and robustness can be improved more largely. A catalyst which contributes to a major electrode reaction is hardly carried by the fibrous carbon contained in the porous nano carbon layer, and thereby a laminated structure unit containing the porous nano carbon layer is thought to be carrier-less. Here, since the movement of the substance such as moisture discharge can be performed more smoothly, it is preferable that a porosity of the catalyst layer is 50-90 Vol. %. In addition, when a porosity of the catalyst layer is in this range, it is possible to move the substance sufficiently without reducing use efficiency of the noble metal.

Figure 4:
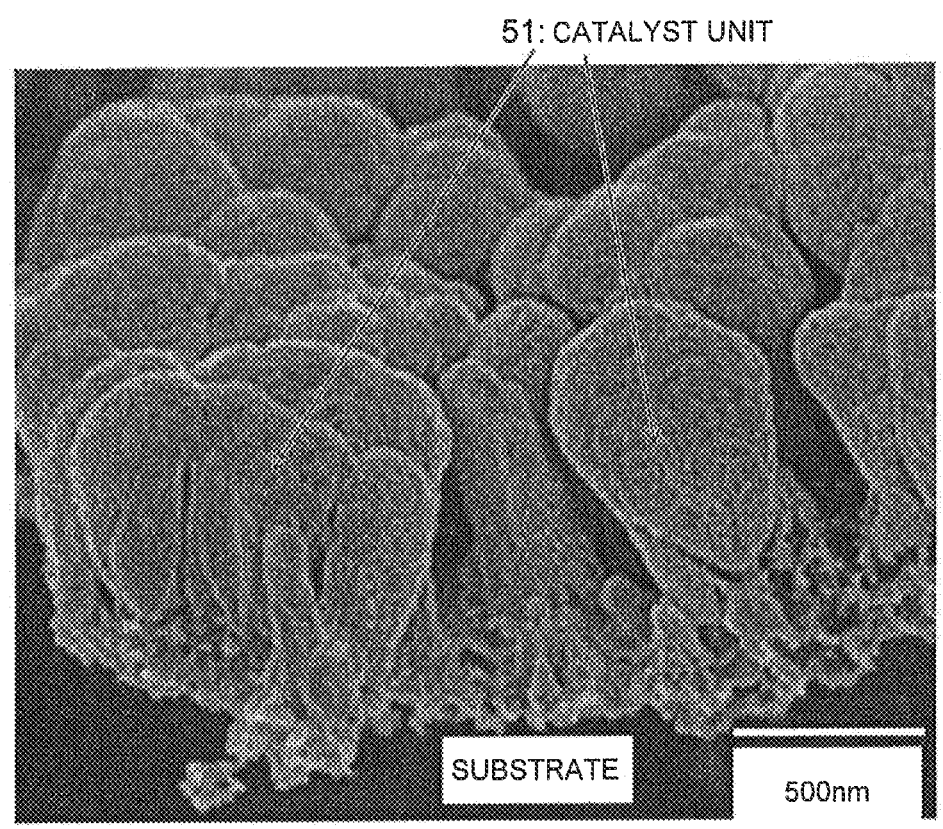
FIG. 4 is a transmission electron microscope photograph of a medium magnification of a section of the membrane electrode assembly according to the embodiment.

A feature of the membrane electrode assembly according to the present embodiment lies in an interface between the carrier-less catalyst layer and the electrolyte membrane. In FIG. 3, an observation image around the vicinity of an interface between the electrolyte membrane 4 and the catalyst layer 5 of 2000 times by a transmission electron microscope (TEMX Transmission Electron Microscope) is shown. Though the structure of the catalyst layer slightly differs depending on the manufacturing process and the composition thereof, basically, as shown in FIG. 3, the catalyst layer 5 is formed on a substrate 50, and is composed of a plurality of catalyst units 51 each having a porous body structure or a laminated structure containing a void layer. A bite 52 is formed, in the electrolyte membrane 4 to which the catalyst unit 51 is adjacent, and the interface between the catalyst layer 5-the electrolyte membrane 4 is in a concave/convex structure. FIG. 4 shows a photograph of a higher magnification of the photograph in FIG. 3. The bite 52 of the catalyst unit 51 can be observed more clearly. Further, in FIG. 4, a state is shown in which the electrolyte membrane 4 has been removed, so as to make clear the catalyst unit 51.

The catalyst unit 51 forms the bite 52 in the electrolyte membrane 4, and thereby the interface between the electrolyte membrane 4-the catalyst layer 5 becomes in a concave/convex shape, and this enabled a significant improvement of the humidity robustness of the membrane electrode assembly, the electrochemical cell. Though the detailed mechanism has not been sufficiently clarified yet, it is thought that this is because a water content inside the carrier-less porous catalyst layer, and a distribution state of the water have been adjusted by the electrolyte membrane 4 around the catalyst unit 51, the water management capability of the catalyst layer 5 has been improved, and thereby gas diffusion indispensable for the electrode reaction has been promoted. In the case of a fuel cell cathode, water is generated by an oxygen reduction reaction on a surface of the catalyst layer 5, and since an amount of the generated water is proportional to a current density, a water generated amount is particularly large at the time of high current density generation. A water clogging phenomenon such as flooding is suppressed, by the concave/convex interface due to the bite 52 according to the present embodiment, and air is smoothly supplied to a reaction site, and even when a humidity of the supplied air is high, the reduction of the property of the fuel cell is small.

The present invention, hereinafter, the MEA was evaluated regarding the following items.

<Thickness of Carrier-Less Catalyst Layer>

A measuring method of "a catalyst layer thickness" is as follows.

Figure 8:
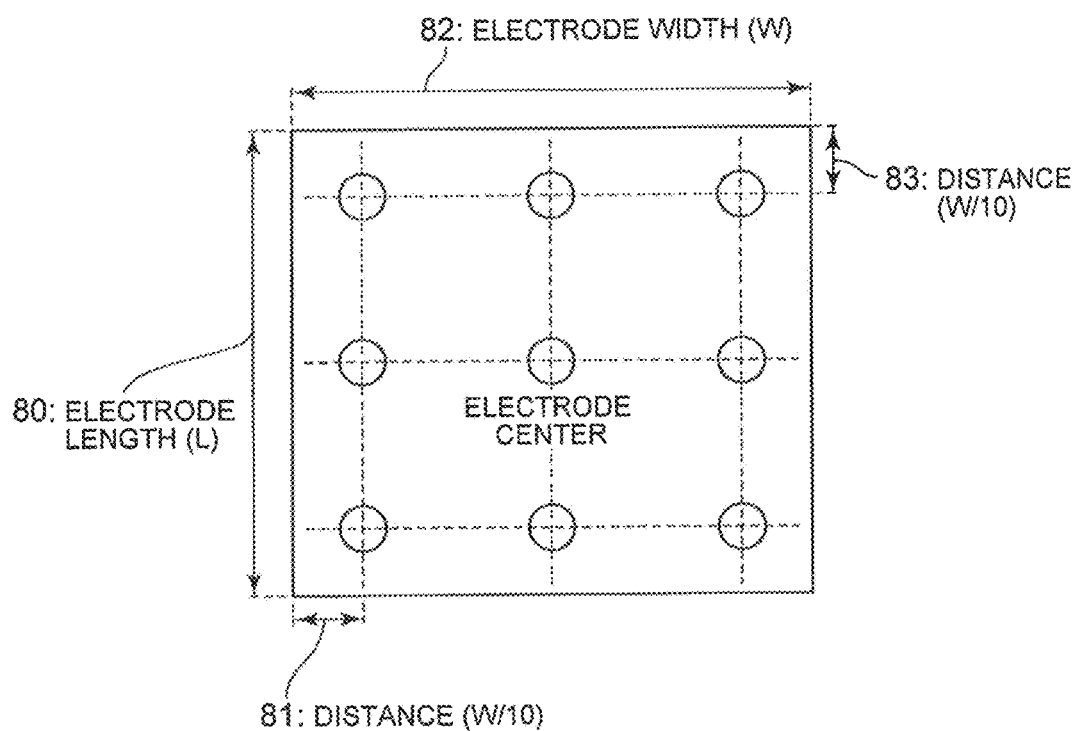
FIG. 8 is a diagram showing measuring spots of a biting uniformity coefficient of the catalyst layer according to the embodiment.

To begin with, samples of nine spots were cut out from an MEA. The positions of the nine spots are shown in FIG. 8. Next, samples were cut out from centers of the samples of the nine spots, to prepare samples for TEM observation. In order to make it easy to observe an interface between an electrolyte membrane and a catalyst, the sample was immersed in a Ru ion solution of 0.1 M-1 M, for example, to perform pretreatment.

Next, each of the nine spots of the MBA was observed by a TEM, for three points/spot. A TEM image of 2000-800000 times was obtained, and a catalyst material, an electrolyte membrane, an ionomer, and a fine hole were distinguished, from the contrast thereof.

Finally, a catalyst layer thickness of each field of view was measured. Here, regarding "the catalyst layer thickness", an average value of measurement values of the whole fields of view of the above-described respective samples is defined as the catalyst layer thickness of this MBA. Based on the catalyst layer thickness obtained like this, a porosity of the catalyst layer is obtained as (1−thickness corresponding to platinum amount/catalyst layer thickness).

<Biting Ratio of Catalyst Layer>

An average biting ratio of a catalyst layer can be is obtained by measuring biting depths at several points and averaging them. In the present embodiment, since two side surfaces exist for one catalyst unit in the TEN observation, a biting depth of the catalyst unit is made to be an average value of the biting depths in the two side surfaces. As shown also in FIG. 3, there are many cases that a plurality of the catalyst units exist continuously (a catalyst unit group), and a bite of the catalyst unit inside the group cannot be identified by the TEM observation. In this case, a biting depth of a catalyst unit outside the group was employed as a representative value of the whole units of the group.

To begin with, a biting depth of each catalyst unit of each field of view was measured, and a biting ratio (=a biting depth/a thickness of catalyst layer) was calculated. A ratio of catalyst units in which a biting ratio thereof is 10-80% was obtained, and was made to be a biting distribution. Average values of the three fields of view of each spot were calculated, and thereby were calculated as an average biting ratio and a biting distribution of the catalyst layer of the relevant spot. Average values of the measurement values of the respective samples of the whole spots were made to be an average biting ratio, a biting distribution of the catalyst layer of this MEA, and were summarized in Table 1.

A ratio of a highest value (HH) to a lowest value (LL) of the average biting ratio of the catalyst layer in the nine spots of each MEA is a value calculated as "a biting uniformity coefficient (=HH/LL) of the catalyst layer" in the relevant MEA. This ratio forms an index indicating that the lower this ratio is, the more uniform the biting of the catalyst layer in the whole electrode is, and preferably this is not more than 5 times, and more preferably this is not more than 3 times. This can also be used as a parameter for interface control by a joining process.

An average depth of the bite 52 of the catalyst layer 5 into the above-described electrolyte membrane 4 is preferably not less than 10% and not more than 80% of the thickness of the catalyst layer 5. If it is not more than 10%, the water management is insufficient, and if it exceeds 80%, air diffusion from the gas diffusion layer to the catalyst unit 51 is blocked, and thereby robustness of the electrochemical cell is low. An average depth of the bite 52 is more preferably not less than 20% and not more than 80% of the catalyst layer thickness.

Figure 6:
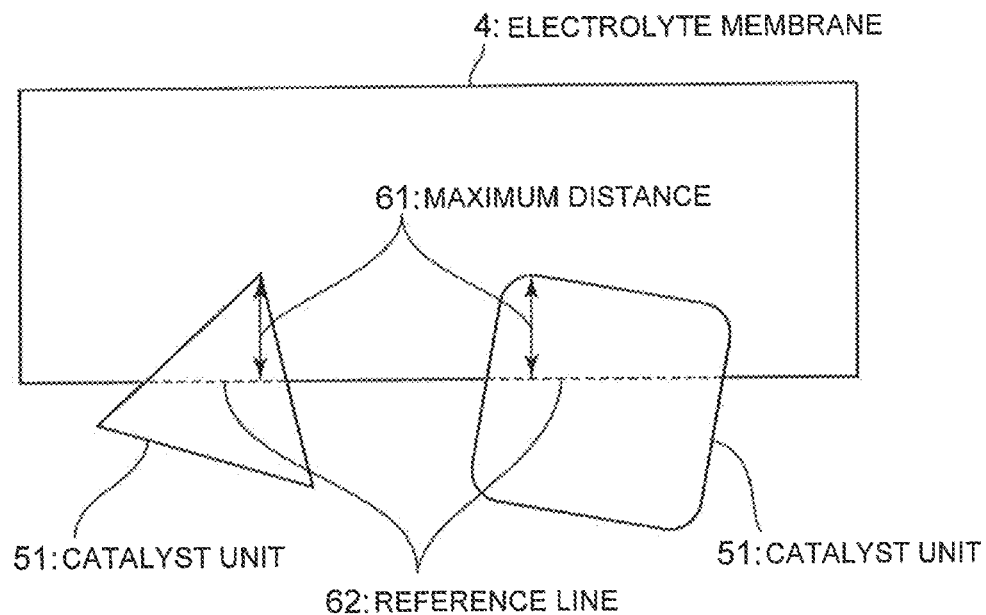
FIG. 6 is an explanation diagram to define a bite according to the embodiment.

In the present invention, regarding the definition of the biting depth in this bite 52, for the catalyst units 51 with various different shapes, as described in FIG. 6, a line connecting intersections of the catalyst units 51 and the electrolyte membrane 4 on the SEM photograph is determined as a reference line 62, and a maximum distance 61 out of the distances from the respective points on the interface between the catalyst unit 51 and the electrolyte membrane 4 to the reference line 62 is defined as a biting depth for each catalyst unit 51.

Figure 5:
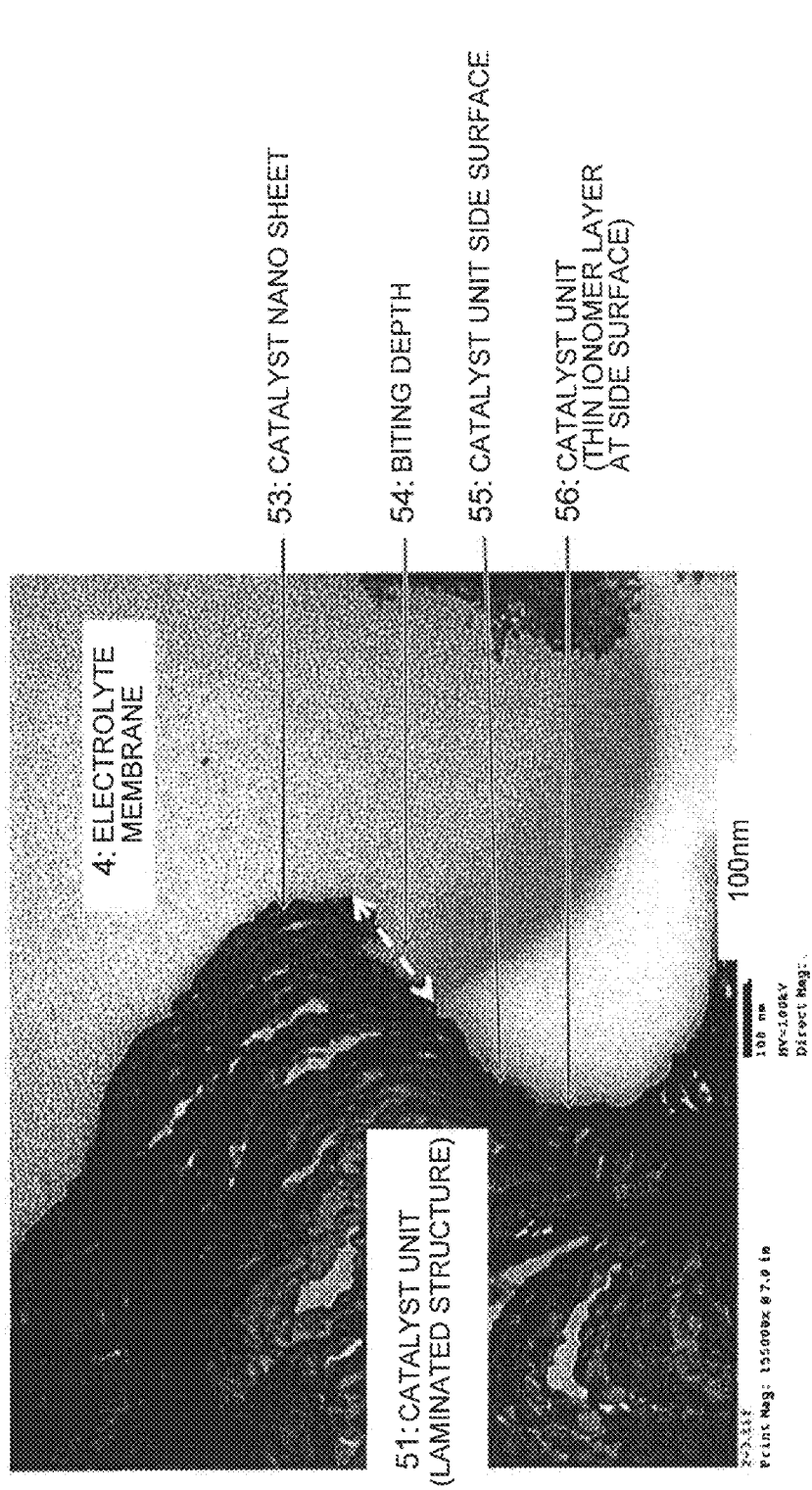
FIG. 5 is a transmission electron microscope photograph of a high magnification of a section of the membrane electrode assembly according to the embodiment.

The catalyst layer 51 of the present invention can form a thin ionomer layer 56 on an outer circumferential surface of the unit. As shown in FIG. 5, it is found that the ionomer layer 56 of a thickness of about 10 nm exists on the side surface of the catalyst unit 51. By this means, the proton conduction or water management of the electrochemical cell can be improved, and thereby the robustness can be more improved.

Since a lot of the catalyst units 51 exist in the catalyst layer 5, it is preferable that the bites 52 into the electrolyte membrane are kept uniform as much as possible in the whole catalyst layer 52. It is preferable that a ratio of the bites 52 of 50% or more of the whole catalyst units in the catalyst layer 5 is within 10-80% of the thickness of the catalyst layer 5. Further, when an area of the electrode is large, such as not less than 10 cm$^2$, since the bites 52 of the catalyst unit 51 into the electrolyte membrane 4 deviate sometimes, depending on the positions inside the catalyst layer 5, by a manufacturing process of the MEA, the management of the process is important. In the present invention, in order to quantitatively evaluate the uniformity coefficient of the bites 52 of the catalyst unit 51, the above-described "biting uniformity coefficient of the catalyst layer" can be used. In addition, when an electrode length 80 and an electrode width 82 were made to be L and N, respectively, a distance 81 was made to be W/10, and a distance 83 was made to be L/10. In addition, in the case of a fuel cell, the uniformity coefficient can be monitored by a circuit potential or a leak current of the cell. For example, when the uniformity coefficient is good, an open circuit potential of 0.9 V or more is observed in many times, even at a cell temperature of 80° C.

A prescribed catalyst material to be employed for the carrier-less catalyst layer according to the present embodiment contains at least one kind selected from a group consisting of noble metal elements such as Pt, Ru, Rh, Os, Ir, Pd and Au. The catalyst material like this is excellent in catalyst activity, conductivity and stability. The above-described metal can be used in the form of an oxide, and a composite oxide or a mixed oxide containing two or more kinds of the metals may be used.

An optimum noble metal element can be appropriately selected in accordance with a reaction in which the MBA is used. For example, when an oxygen reduction reaction is necessary as a cathode of a fuel cell, a catalyst having a composition indicated by $Pt_uM_{1-u}$ is preferable. Here, u is $0<u\leq 1$, and an element M is at least one kind selected from a group consisting of Co, Ni, Fe, Mn, Ta, N, Hf, Si, No, Ti, Zr, Nb, V, Cr, Al and Sn. This catalyst contains Pt of more than 0 atomic % and not more than 90 atomic %, and the element M of not less than 10 atomic % and less than 100 atomic %.

The electrolyte membrane requires ion conductivity in many cases. As the electrolyte having proton conductivity, for example, a fluorine resin having a sulfonic acid group (for example, Nafion (trademark, made by Du Pont Co.), Flemion (trademark, made by Asahi Kasei Corporation), and Aciplex (trademark, made by ASAHI GLASS CO. LTD.), and so on), and an inorganic substance such as tungsten acid and phosphotungsten acid can be used.

The thickness of the electrolyte membrane can be appropriately determined in consideration of the property of the MEA. From the viewpoint of strength, solubility resistance, and the output property of the MEA, a thickness of the electrolyte membrane is preferably not less than 5 μm and not more than 300 μm, and more preferably not less than 5 μm and not more than 200 μm.

When the MEA is used in a fuel cell, the electrodes of the both sides are an anode and a cathode. Hydrogen is supplied to the anode, and air is supplied to the cathode.

The gas diffusion layer generally requires porosity and conductivity. It contains a water repellent agent in many cases, so as to prevent water clogging that is a so-called flooding phenomenon from occurring. The water repellent agent is a florine-based polymer material, such as, polytetrafluoroethylene (PTFE), polyvinylidene floride (PVFD), polyhexafluoropropylene, tetrafluoroethylene-hexafluoropropropylene copolymer (FEP).

Figure 7:
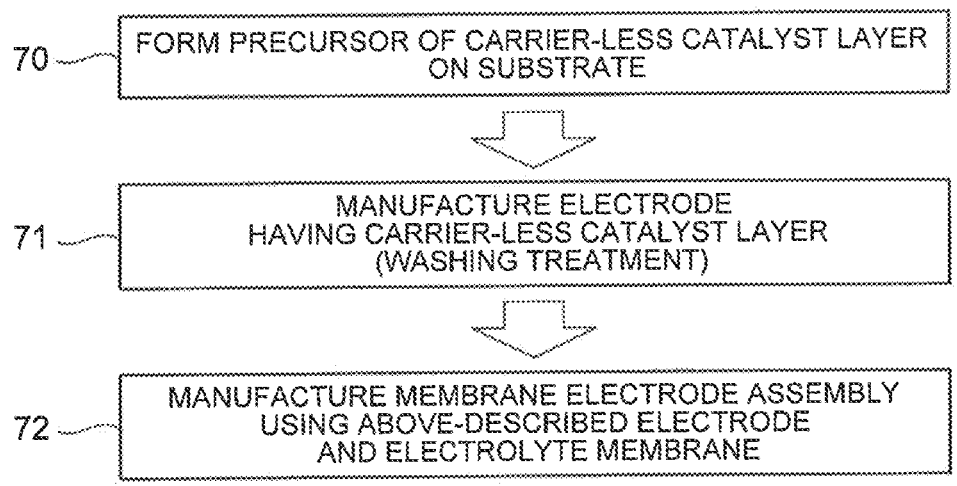
FIG. 7 is a diagram schematically showing a manufacturing method of the membrane electrode assembly according to the embodiment.

The membrane electrode assembly according to the present embodiment can be manufactured, as described in FIG. 7, by a method which is provided with a first process 70 to form a precursor having a carrier-less porous catalyst layer, a second process 71 to form an electrode forming the carrier-less catalyst layer by a washing treatment, a third process 72 to obtain a membrane electrode assembly having a concave-convex interface by compounding an electrolyte membrane and the electrode.

To begin with, a manufacturing method of the carrier-less porous catalyst layer according to the present embodiment will be described in brief.

To begin with, in the case of manufacturing a catalyst layer also having a catalyst unit, a catalyst layer precursor is formed on a substrate, by simultaneously sputtering or depositing a catalyst material and a pore forming agent material. Next, the pore forming agent is removed, to obtain an electrode. In the case of manufacturing a catalyst layer having a laminated structure containing a void layer, a catalyst precursor is formed on a substrate, by alternately sputtering or depositing a material containing a catalyst material and a pore forming agent material. Next, the pore forming agent is removed, to obtain an electrode.

The MEA according to the embodiment is manufactured by joining the above-described catalyst layer which is used as at least one of the first and second catalyst layers 5, 7, with an electrolyte membrane. When forming the concave-convex interface between the catalyst layer of the MEA of the present embodiment and the electrolyte membrane, a joining process of the catalyst layer and the electrolyte membrane is important. By this joining process, a bite amount of the catalyst unit into the electrolyte membrane, a biting distribution, a biting uniformity coefficient of the respective catalyst units in the whole catalyst layer can be controlled.

Generally, the catalyst layer and the electrolyte membrane are joined by heating and pressurizing. In this case, when a substrate for forming the catalyst layer is the gas diffusion layer, the substrates respectively containing the catalyst layer 5 and the catalyst layer 7 are laminated while sandwiching the electrolyte membrane 4 between them as shown in FIG. 1, and are joined, to obtain the MEA 1. When a substrate for forming the catalyst layer is a transfer substrate, to begin with, the catalyst layer 5 is transferred from the transfer substrate to the gas diffusion layer 6, and then the catalyst layer 7 is transferred to the gas diffusion layer 8. The two catalyst layers are laminated while sandwiching the electrolyte membrane 4 between them as shown in FIG. 1, and are joined by heating and pressurizing, to obtain the MEA 1. Or at least one of the catalyst layers 5 and 7 is transferred to the electrolyte membrane 4, and then the gas diffusion layer may be arranged on the catalyst layer. These are laminated as shown in FIG. 1, and are heated and pressurized, to obtain the MEA 1.

The joining of the respective members as described above is generally performed using a hot press machine. The press temperature is a temperature higher than a glass transition temperature of a polymer electrolyte which is to be used as a binding agent in the electrodes 2, 3 and the electrolyte membrane 4, and is generally not less than 100° C. and not more than 400° C. Though the pressing pressure depends on the hardness of the electrodes 2, 3, it is generally not less than 5 kg/cm$^2$ and not more than 200 kg/cm$^2$. In order to precisely control a biting amount, a biting distribution and a biting uniformity coefficient of the catalyst unit, parameter control of the hot press machine is important. In order to obtain a biting amount, a biting distribution, and a biting uniformity coefficient which are optimum, the present invention controls a heating temperature, a crimping system, a pressure or a crimping width of the hot press machine, in accordance with the physical property and flatness of the substrate with the catalyst layer.

In addition, when joining the catalyst layer and the electrolyte membrane, the following process may be employed. An ion conductive membrane is formed on a substrate with a catalyst layer, and a catalyst layer of a counter electrode is attached on it. When the substrate is the gas diffusion layer, the assembled one can be used as the MEA 1, without change. When the substrate is a transfer substrate, the gas diffusion layer is substituted, and then the assembled one is used as the MEA 1. In this case, biting of the catalyst unit can be controlled by a concentration and a composition of a solvent for forming the ion conductive membrane, and a forming temperature and a forming time, and so on.

As described above, the MEA 1 according to the embodiment has high robustness, because an optimum catalyst layer-electrolyte membrane interface is used.

The electrochemical cell in the present embodiment can be made in the form of an electrolytic cell or a MEMS (Micro Electro Mechanical Systems) type electrochemical cell. For example, the electrolytic cell can be made with the same configuration as the above-described fuel cell, except that it contains an oxygen generating catalyst electrode in place of the anode, as the first electrode 2.

In addition, it is also possible to control biting of the catalyst unit into the electrolyte membrane by the assemblying of the cell, such as a clamp pressure in the direction vertical to the MEA, for example.

EXAMPLES

Hereinafter, examples and comparative examples will be described.

In Table 1, observation results of a catalyst layer, an electrode, a catalyst layer-electrolyte membrane interface, and evaluation results of an electrochemical cell, and so on of examples 1-6, comparative examples 1-2 are summarised. In addition, since the catalyst layer is carrier-less, a porosity of the catalyst layer was obtained from a ratio of a catalyst layer thickness to a thickness corresponding to a loading amount of platinum of the catalyst.

| example/comparative example | carrier-less catalyst layer | | | average biting ratio (%) | biting distribution (%) | biting uniformity coefficient (ratio) | power generation property (A/cm$^2$@0.6 V) | active current ratio |
|---|---|---|---|---|---|---|---|---|
| | unit form | thickness (nm) | porosity (%) | | | | | |
| example 1 | porous laminated layer | 400 | 87.5 | 40 | 60 | 3 | 1.7 | 0.76 |
| example 2 | porous laminated layer | 350 | 85.7 | 30 | 60 | 2 | 1.8 | 0.83 |
| example 3 | porous laminated layer | 300 | 83.3 | 10 | 60 | 3 | 1.8 | 0.80 |
| example 4 | porous laminated layer | 100 | 50 | 80 | 70 | 2 | 1.5 | 0.78 |
| example 5 | porous laminated layer | 500 | 90 | 60 | 65 | 5 | 1.8 | 0.82 |
| example 6 | porous laminated layer | 85 | 40 | 50 | 70 | 3 | 1.5 | 0.75 |
| comparative | porous | 350 | 85.7 | 5 | 30 | 4 | 1.4 | 0.51 |

-continued

| example/comparative example | carrier-less catalyst layer | | | average biting ratio (%) | biting distribution (%) | biting uniformity coefficient (ratio) | power generation property (A/cm²@0.6 V) | active current ratio |
|---|---|---|---|---|---|---|---|---|
| | unit form | thickness (nm) | porosity (%) | | | | | |
| example 1 | laminated layer | | | | | | | |
| comparative example 2 | porous laminated layer | 350 | 85.7 | 90 | 60 | 2 | 1 | 0.70 |

<Manufacturing of an Electrode having a Carrier-Less Catalyst Layer and a Membrane Electrode Assembly>
(Manufacturing of an Electrode of a Reference Anode of a Fuel Cell)

As a substrate, a carbon paper Toray 060 (made by Toray Industries, Inc.) having a carbon layer with a thickness of not less than 1 μm and not more than 50 μm was prepared. On this substrate, a catalyst layer composed of a unit having a porous body structure was formed by a sputtering method, so that a loading density of the PT catalyst becomes 0.05 mg/cm², to obtain an electrode having a carrier-less porous catalyst layer. This electrode was formed into a square shape of 7.07 cm×7.07 cm, and was used as a reference anode of the examples 1-6, the comparative example 1-2.

Examples 1-6, Comparative Examples 1-2

As a substrate, a carbon paper Toray 060 (made by Toray Industries, Inc.) having a carbon layer with a thickness of 1-50 μm on its surface was prepared. On this substrate, a platinum catalyst layer composed of a unit having a porous body structure or a laminated structure containing a void layer was formed by a sputtering method, to obtain an electrode having a carrier-less porous catalyst layer (a platinum loading amount is 0.1 mg/cm²). At the time of sputtering, a process was adjusted, so that the form of the catalyst layer unit, the thickness of the catalyst layer respectively become the values shown in the above-described Table 1. These electrodes were formed into a square shape of 7.07 cm×7.07 cm, and were prepared as cathodes of fuel cells.

Nafion 211 (made by Du Pont Co.) was used as the electrolyte membrane, and was joined along with the above-described fuel cell cathode and the above-described reference anode by thermocompression bonding, to obtain a MEA for a fuel cell (an area of the electrode is about 50 cm²). In order that the biting amount indicated in Table 1 is obtained, parameters of the hot press machine for thermocompression bonding were controlled (a temperature width of the catalyst layer: 125° C.-160° C., at a pressure of 10-50 kg/cm², for 1 minute-5 minutes).

In the case of water electrolysis, since a cathode for water electrolysis that is a hydrogen generating electrode generates an electrode reaction opposite to a fuel cell anode, it can be manufactured in the same manner as the above-described reference anode for a fuel cell. On the other hand, since an anode for water electrolysis that is an oxygen generating electrode has a high electrode potential, and higher durability than a fuel cell is required, a titanium substrate is generally used. An anode for water electrolysis can be manufactured in the same method except that the substrates in the above-described examples 1-6 are changed into a titanium mesh. In addition, when an oxide containing Ir is used in place of platinum as a catalyst, higher activity and durability can be obtained.

<Manufacturing of a Unit Cell of a Fuel Cell as an Example of an Electrochemical Cell>

The obtained MEA for a fuel cell was set between two separators where a flow path is provided, to manufacture a unit cell (an electrochemical cell) of a polymer electrolyte membrane fuel cell.

The respective MEAs were evaluated using the manufactured unit cells, regarding the following items.

(2) Evaluation of Cell Current and Robustness

Conditioning was performed to the obtained unit cell for one day. Then, it was kept at 80° C., and hydrogen was supplied to the anode as fuel, and air was supplied to the cathode. A flow rate of hydrogen was made to be 1 L/min, and a flow rate of air was made to be 4 L/min. Relative humidities of hydrogen and air were all 65%. While hydrogen and air were supplied, the unit cell was discharged, with the cell voltage being kept constant at 0.6 V, and a cell current ($I_C$) after 10 minutes was measured, and a current density $i_C$ ($i_C=I_C/50$ cm²) was obtained.

This result is summarized as a cell current density in Table 1 described below. The same measurement was performed as described above except that humidities of hydrogen and air were all changed to 100%, to obtain a current density $i_W$. Using WR (WR=$i_W/i_C$) as an index of robustness, WRs of the respective MBAs were calculated and summarised in Table 1.

As shown in the above-described Table 1, in each of the MBAs of the examples 1-6, an average biting ratio of the catalyst unit is 10-80%. In each of the cells of the examples, the robustness thereof was good, such that each has a power generation property of 1.5-1.8 A/cm², and an active current ratio of 0.72-0.85. Since the MEA of the comparative example 1 has a low average biting ratio of the catalyst unit, the humidity dependency was large, and the robustness was inferior. Regarding the MEA of the comparative example 2, since an average biting ratio was too high, the cell current density $i_C$ was low. In addition, though not stated in Table 1, the property of the MEA of the comparative example 2 was unstable sometimes.

According to at least one of the embodiments described above, it is possible to provide a membrane electrode assembly which has a high cell voltage, high robustness, and high durability with a small amount of noble metal, by controlling an interface of a catalyst layer-an electrolyte membrane layer of a membrane electrode assembly having a carrier-less catalyst layer. At the same time, an electrochemical cell employing this membrane electrode assembly can exert high robustness.

While certain embodiments have been described, these embodiments have been presented by way of example only, and are not intended to limit the scope of the inventions. A unit cell of a polymer electrolyte membrane fuel cell having hydrogen fuel was listed, as an electrochemical cell, but this invention can be similarly applied to an electrochemical cell other than this, that is, an electrochemical cell in which ions move or a substance such as water moves through an electrolyte membrane or a diaphragm, such as a methanol fuel cell, a polymer electrolyte type water electrolysis. Indeed, the novel embodiments described above may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A membrane electrode assembly comprising:
    a catalyst layer being porous and containing a catalyst material;
    the catalyst layer comprising a plurality of catalyst units each having a porous body structure or a laminated structure containing a void layer; and
    an electrolyte membrane adjacent to the porous catalyst layer;
    wherein the plurality of catalyst units bite into the electrolyte membrane, and an average biting ratio is not less than 10%, and not more than 80% of a thickness of the catalyst layer, and
    wherein an interface between the catalyst layer and the electrolyte membrane is in a concave convex structure.

2. The membrane electrode assembly according to claim 1, wherein:
    the catalyst units have a porosity of not less than 50%.

3. The membrane electrode assembly according to claim 2, wherein:
    a biting uniformity coefficient of the catalyst layer, which is a ratio of a highest value (HH) to a lowest value (LL) of the average biting ratio of the catalyst layer in nine spots of each membrane electrode assembly, is not more than 5.

4. The membrane electrode assembly according to claim 2, wherein:
    the catalyst material is at least one kind selected from a group of noble metal elements consisting of Pt, Ru, Rh, Os, Ir, Pd and Au.

5. The membrane electrode assembly according to claim 1, wherein:
    a biting uniformity coefficient of the catalyst layer, which is a ratio of a highest value (HH) to a lowest value (LL) of the average biting ratio of the catalyst layer in nine spots of each membrane electrode assembly, is not more than 5.

6. The membrane electrode assembly according to claim 5, wherein:
    the catalyst material is at least one kind selected from a group of noble metal elements consisting of Pt, Ru, Rh, Os, Ir, Pd and Au.

7. The membrane electrode assembly according to claim 1, wherein:
    the catalyst material is at least one kind selected from a group of noble metal elements consisting of Pt, Ru, Rh, Os, Ir, Pd and Au.

8. An electrochemical cell comprising:
    a first electrode capable of operating as an anode;
    an electrolyte membrane arranged adjacent to the first electrode; and
    a second electrode arranged adjacent to the electrolyte membrane and capable of operating as a cathode;
    wherein at least one of the first and second electrodes comprises a catalyst layer containing a catalyst material, the catalyst layer comprises a plurality of catalyst units each having a porous body structure or a laminated structure containing a void layer, and the plurality of catalyst units bite into the electrolyte membrane, and an average biting ratio is not less than 10%, and not more than 80% of a thickness of the catalyst layer, and
    wherein an interface between the catalyst layer and the electrolyte membrane is in a concave convex structure.

* * * * *